Figure 1:
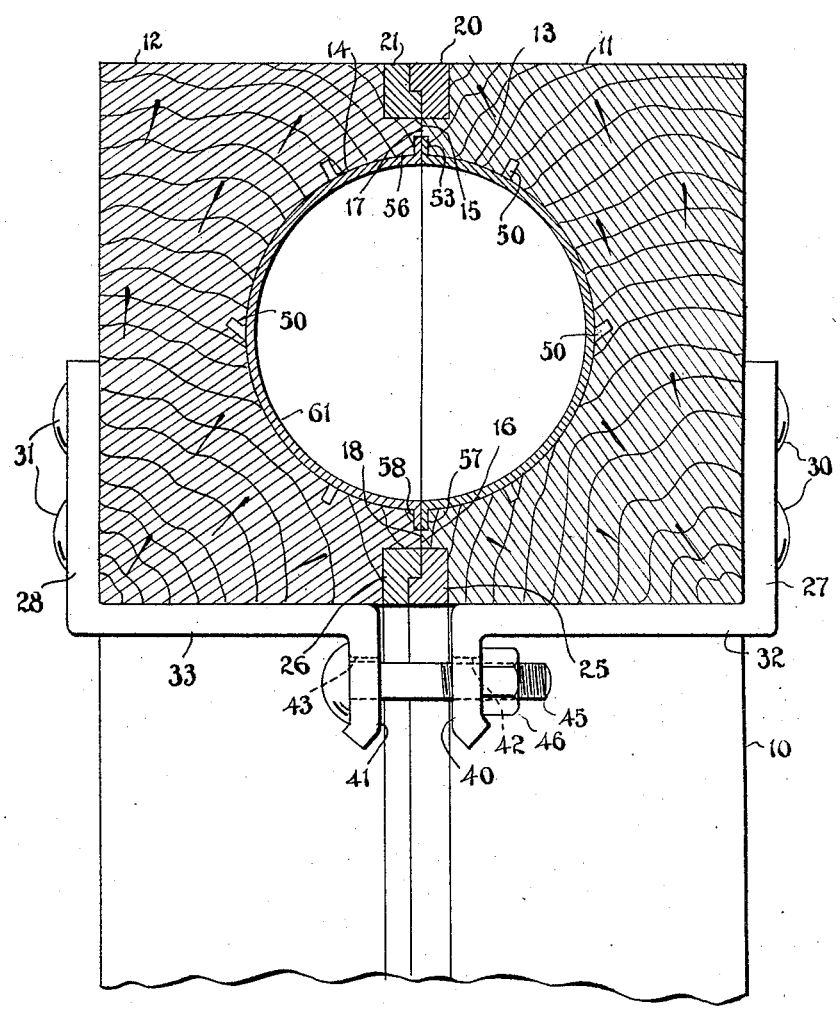

Nov. 22, 1932.  R. W. SNYDER  1,888,702

MOLD

Filed Aug. 1, 1929

Inventor
Robert W. Snyder

By

Attorney

Patented Nov. 22, 1932

1,888,702

UNITED STATES PATENT OFFICE

ROBERT W. SNYDER, OF AKRON, OHIO, ASSIGNOR TO THE GOODYEAR TIRE & RUBBER COMPANY, OF AKRON, OHIO, A CORPORATION OF OHIO

MOLD

Application filed August 1, 1929. Serial No. 332,607.

This invention relates to the manufacture of hollow rubber articles and it has particular relation to a mold for vulcanizing inner tubes for pneumatic tires.

One object of the invention is to provide a mold, for vulcanizing hollow rubber articles, of such construction that the heat employed in the vulcanizing process may be localized within the hollow rubber article being cured, without rapid dissipation thereof to the exterior of the mold.

Another object of the invention is to provide a mold for vulcanizing hollow rubber articles in which only a small amount of metal need be employed.

Another object of the invention is to provide a method of manufacturing molds for curing hollow rubber articles, by means of which the mold members may be formed of different materials bonded together to provide a unitary assembly.

One method of manufacturing inner tubes for pneumatic tires comprises forming a tube of circular form from raw or uncured rubber and thereafter curing it under heat and pressure. Heat may be supplied to the rubber either by admitting a heated fluid through the valve stem of the tube to the interior thereof or by subjecting the outer surface of the tube to contact with a heated portion of the mold.

In the event the heat is supplied to the interior of the tube, it is highly important that some means be provided for preventing dissipation of such heat through the tube and the parts of the mold retaining it. As a a rule, the surface of the mold contacting with the inner tube must be composed of metal in order that such surface may be made sufficiently smooth to prevent blemishes from being formed in the exterior surface of the tube. The provision of a mold having a metallic surface effectively united with an insulating material, so far as known, has never been suggested.

According to this invention, it is proposed to make the sections of the mold largely of insulating material such as wood. Each of the sections is so provided with a cavity for receiving a part of an inner tube that when the sections are disposed in their operative positions with a tube therebetween conjointly the cavities enclose the entire tube. Preferably, the surfaces of the wood defining the cavities are formed with recesses and thereafter, by means of a metal spraying device, the surfaces of the sections defining the cavities are coated with finely divided metal, the particles of which effectively interlock with each other. That metal sprayed into the recesses in the surfaces of the wood provides interlocking means for more effectively retaining the metal and the wood together. After the surfaces defining the cavities have been so coated with metal, the latter may be surfaced by suitable machinery in order to provide a smooth interior surface for receiving an inner tube.

Figure 2:
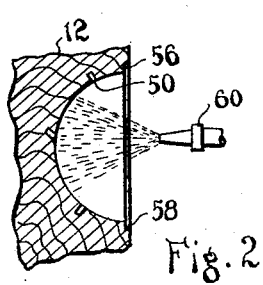

For a better understanding of the invention, reference may now be had to the accompanying drawing, forming a part of the specification, in which:

Figure 1 is a fragmentary cross-sectional view of a mold constructed according to the invention, and Figure 2 is a fragmentary cross-sectional view of one of the mold sections illustrating a method of coating a surface thereof with metal.

Referring to Figure 1, a mold for vulcanizing inner tubes for pneumatic tires is illustrated generally at 10 and comprises a pair of mold sections 11 and 12, made of wood, having a low coefficient of heat conductivity. These sections are provided respectively with annular cavities 13 and 14 which conjointly form a cavity for receiving an inner tube. On opposite sides of the cavities, the mold section 11 is provided with faces 15 and 16 which are adapted to abut corresponding faces 17 and 18 on the section 12. Adjacent the faces 15 and 17, the sections 11 and 12 are provided, respectively, with metallic interlocking rings 20 and 21 while adjacent the faces 16 and 18 such sections are provided with other metallic interlocking rings 25 and 26. The mold sections are adapted to be retained together by brackets 27 and 28 secured respectively to the outer sides of the sections 11 and 12 by screws 30 and 31.

These brackets, respectively, are provided with angle portions 32 and 33 which extend axially of the sections to positions adjacent the locking rings 25 and 26. Other angle portions 40 and 41 project radially inwardly from the inner and adjacent ends of the portions 32 and 33, and are provided with slots 42 and 43. Bolts 45, disposed in the slots 42 and 43, and having nuts 46 on their threaded ends, retain together the portions 40 and 41 of the brackets 27 and 28, respectively, thereby retaining the mold sections in assembled relation.

The faces of the mold sections 11 and 12 defining the cavities 13 and 14 are provided with a plurality of recesses 50. Also, cylindrical grooves 53 and 56 are provided in the sections 11 and 12 adjacent the surfaces 15 and 16, respectively, while on the opposite side of the sections adjacent the surfaces 16 and 18, similar grooves 57 and 58, respectively, are provided.

The surfaces of the mold sections defining the cavities 13 and 14 then are coated with finely divided metal 61 by means of a spray gun 60 provided for that purpose (Figure 2). Metal of sufficient quantity is sprayed upon such surfaces until a considerable thickness of metal is built up and thereafter, the outer surfaces of the metallic coat are surfaced by suitable machinery to provide a smooth surface for receiving an inner tube. During the operation of spraying metal on such surfaces, part of the metal so sprayed enters the recesses 50 in the mold sections and effects an efficient interlocking means between the metal coat and the mold sections. Metal is also sprayed into the grooves 53, 56, 57 and 58, which, when surfaced flush with the faces 15, 16 and 17 and 18, provide a close fit between the metal segments.

The spray gun 60 for spraying metal in this manner operates essentially as follows: A metallic wire such as one composed of tin, is slowly fed through a tube at one point in which acetylene gas is burning. This melts the wire. Practically simultaneously with the melting of the wire, a stream of air of high velocity is directed against the molten metal which breaks it into a fine spray. This spray is directed through the end of the gun upon the article which is to be coated. The sprayed metal is not in a molten state when it contacts with the surface upon which it is being applied and hence, the particles are not bound together by what may be termed a welding action. Instead, the particles are interlocked mechanically by reason of the fact that the particles are so fine that when applied upon the surface in the form of a spray they form a unitary layer. In applying this metal to the surface of wood in the mold previously described, the metal adheres strongly to such surface not only because of the interlocking means provided by the metal in the recesses 50, but by reason of the fact that the wood has a comparatively porous and uneven surface due to the grain therein, etc.

From the foregoing description, it is apparent that a mold has been constructed which necessitates the use of only a small amount of metal thereby reducing the expense of manufacture considerably. Moreover, owing to the fact that the mold is composed largely of wood, an effective and inexpensive insulating material constitutes a large part thereof. The method of manufacturing is simple and inexpensive, and a metallic lining may be applied to the cavities defined in the mold sections accurately and efficiently. Such a mold, when in operation, effectively prevents dissipation of the heat in the interior of the tube, thereby reducing the expense of manufacture as well as providing a more uniformly vulcanized product.

Although I have illustrated only the preferred form of the invention and have described that form in detail, it will be apparent to those skilled in the art that the invention is not so limited, but that various modifications may be made therein without departing from the spirit of the invention or from the scope of the appended claim.

What I claim is:

In a mold for a rubber article in which vulcanizing heat is supplied to the interior of the article, said mold having a cavity for receiving the article, a metallic lining for said cavity, means for preventing dissipation of heat through said lining, said means comprising wood secured to said lining, and interlocking projections and recesses arranged respectively on said lining and said wood to retain the latter together.

In witness whereof, I have hereunto signed my name at Akron, in the county of Summit and State of Ohio, U. S. A., this 31st day of July, 1929.

ROBERT W. SNYDER.